Feb. 12, 1929.
O. GANDEE
1,702,113
TRIMMING DEVICE FOR BUILDING TIRES
Filed June 9, 1927
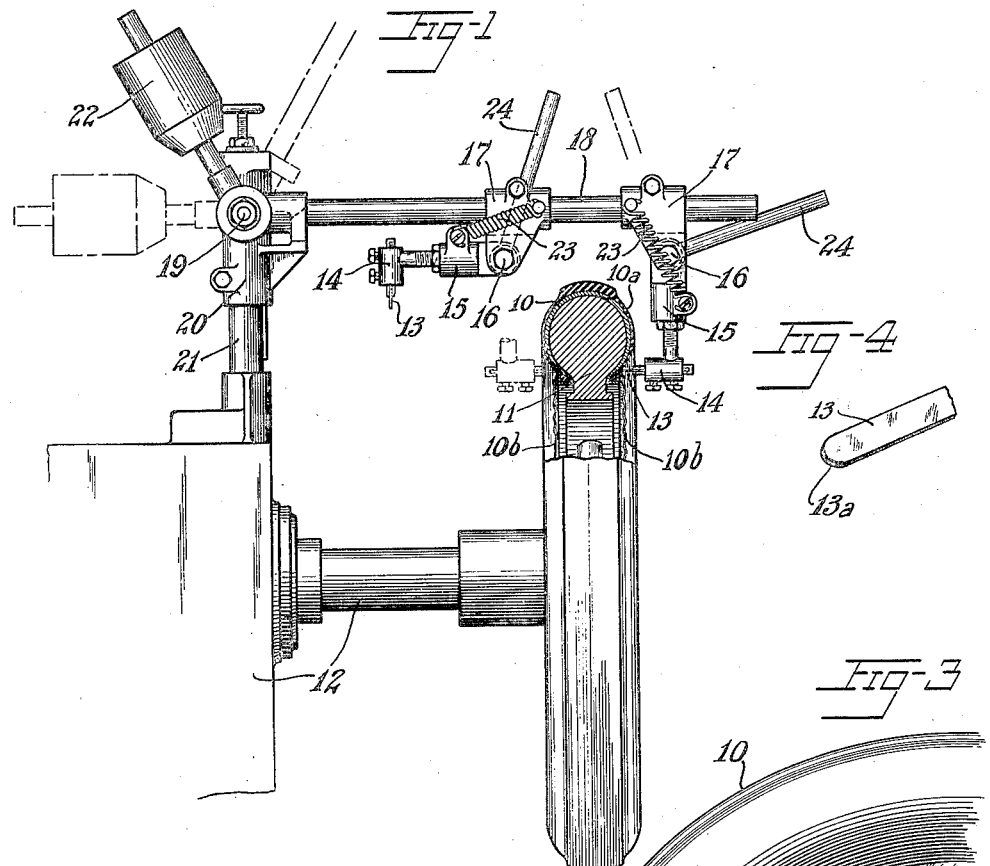
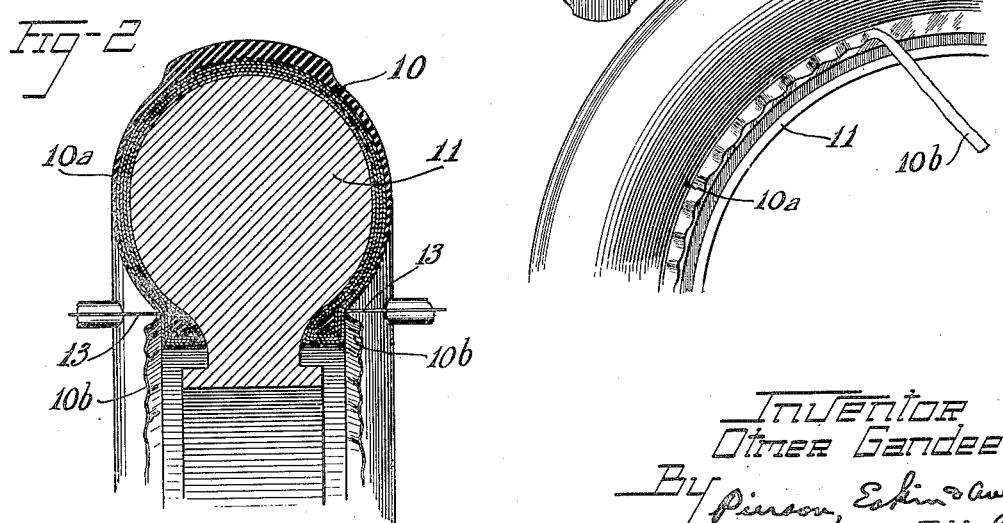
Inventor
Otmer Gandee Patented Feb. 12, 1929.

1,702,113

UNITED STATES PATENT OFFICE.

OTMER GANDEE, OF AKRON, OHIO, ASSIGNOR TO THE B. F. GOODRICH COMPANY, OF NEW YORK, N. Y., A CORPORATION OF NEW YORK.

TRIMMING DEVICE FOR BUILDING TIRES.

Application filed June 9, 1927. Serial No. 197,609.

This invention relates to devices for trimming excess rubber from the side-wall stock, adjacent the bead, in the building of pneumatic tires.

The trimming line is usually at such position above the heel of the bead that the rubber at the line of cut overlies the fabric of the carcass which has necessitated either great care to avoid cutting into the fabric or the turning back of the side-wall stock and the trimming of it with a V-knife.

My chief objects are to provide for economy of time and labor in the operation referred to, to avoid the necessity of sharpening the trimming tool and to provide an accurate trimming of the work.

I find that the rubber may be accurately and satisfactorily cut against the underlying fabric as a backing and without damage to the fabric by employing a dull knife so formed and securely held as to provide a bight defined by the fabric and the cutting margin of the knife, so that the rubber of the side-wall stock, in passing to the cutting point, passes into the bight defined by the converging surfaces of the fabric and the knife.

It is important that the knife be positively held against the driving force of the rotating tire and, at the same time, that provision be made for holding the knife against the fabric yieldingly but with sufficient force to compel it to pinch through and thus sever the rubber notwithstanding that it is so dull as not to cut the fabric. The yielding pressure permits the knife to follow the somewhat uneven surface of the fabric. The relatively tough character of the fabric, in conjunction with the dull condition of the knife, imposes the limit for the inward movement of the knife, although the yielding pressure is sufficiently great to cause the dull knife completely to sever the comparatively soft rubber.

Of the accompanying drawings:

Fig. 1 is an elevation, with parts broken away and in section, of parts of a tire-building machine embodying my invention in its preferred form, and a tire in course of construction thereon.

Fig. 2 is a cross-section of the tire in the vicinity of the trimming knives, the latter being shown in elevation.

Fig. 3 is a side elevation of the work, showing the manner in which it is trimmed.

Fig. 4 is a perspective view of the cutting portion of the preferred embodiment of my trimming knife.

Referring to the drawings, the tire 10 is built upon a core 11 supported and rotated upon a core-rotating device 12.

The knives, one for each side of the work, are shown at 13, 13, each being formed with a rounded, dull cutting edge, such as the edge 13ª, Fig. 4, at its end.

Each knife is mounted in a clamp 14 having a threaded stem mounted in the end of an arm 15 hinged at 16 upon a bracket 17 clamped upon a bar 18 which is pivoted at 19, with a wide bearing, upon a sleeve 20 splined upon a post 21 rising from the frame of the core-rotating device 12. The bar 18 is provided with a counterweight 22 and is adapted to be lowered and raised to bring the knives into position at each side of the tire and to remove them to an inoperative position above the tire.

Each of the arms 15 is connected to the adjacent bracket 17 by a pull spring 23 adapted to act over-center with respect to the pivot 16 of the arm 15, to hold the knife alternatively in yielding engagement with the work, as shown with respect to the right-hand knife in Fig. 1, or in an inoperative position parallel with the bar 18, as shown with respect to the left-hand knife in Fig. 1. For turning the knife-holding arms 15 over-center, and for supplementing by hand the force of the spring 23, each of the arms is provided with a handle 24.

In the operation of the device the carcass of the tire 10 being built upon the core 11 and the rubber tread and side-wall strip 10ª being applied thereto and stitched down to the trimming line, the two knives are brought to their trimming positions and the tire is rotated past them.

The support of the knives is such that they are positively held, mechanically and without effort of the operator, against traveling with the tire, and they are yieldingly urged against the work by the springs 23 and by the operator's pressure upon the handles 24.

The rubber at the trimming line passes into the narrowing bight defined by the dull, rounded end of the trimming knife and thus is pinched apart, the pressing of the rubber against the carcass by the converging edge of the knife preventing the rubber left upon the carcass from gathering or wrinkling, and the fabric of the carcass serving as a backing for the dull knife without being damaged thereby. The strip of rubber 10^b is neatly trimmed off by the knife, and may be easily dislodged from the work by hand.

No sharpening of the knife is required, the line of cut is accurately maintained, injury of the fabric is avoided without laborious care, and the operation is rapid.

Details of the invention are susceptible of modification within the scope of the appended claim.

I claim:

A trimming device for building tires, the said device comprising means for rotatably supporting a tire carcass with an outer surface layer of rubber thereon, a knife, means for positively holding said knife against rotation with the tire and in a position such that an edge of the knife forms with the carcass a narrowing bight for the passage thereinto of the rubber layer in the rotation of the tire, and means for yieldingly holding the knife against the carcass, the edge of the knife contacting the carcass being so dull as not to cut the fabric thereof when the knife is held thereagainst with sufficient force substantially to sever the rubber layer.

In witness whereof I have hereunto set my hand this 2nd day of June, 1927.

OTMER GANDEE.